Oct. 3, 1967   L. H. G. LAMING   3,344,673
TESTING APPARATUS FOR SPACE VEHICLES, IN PARTICULAR
FOR SATELLITES
Filed Jan. 14, 1965   4 Sheets-Sheet 1

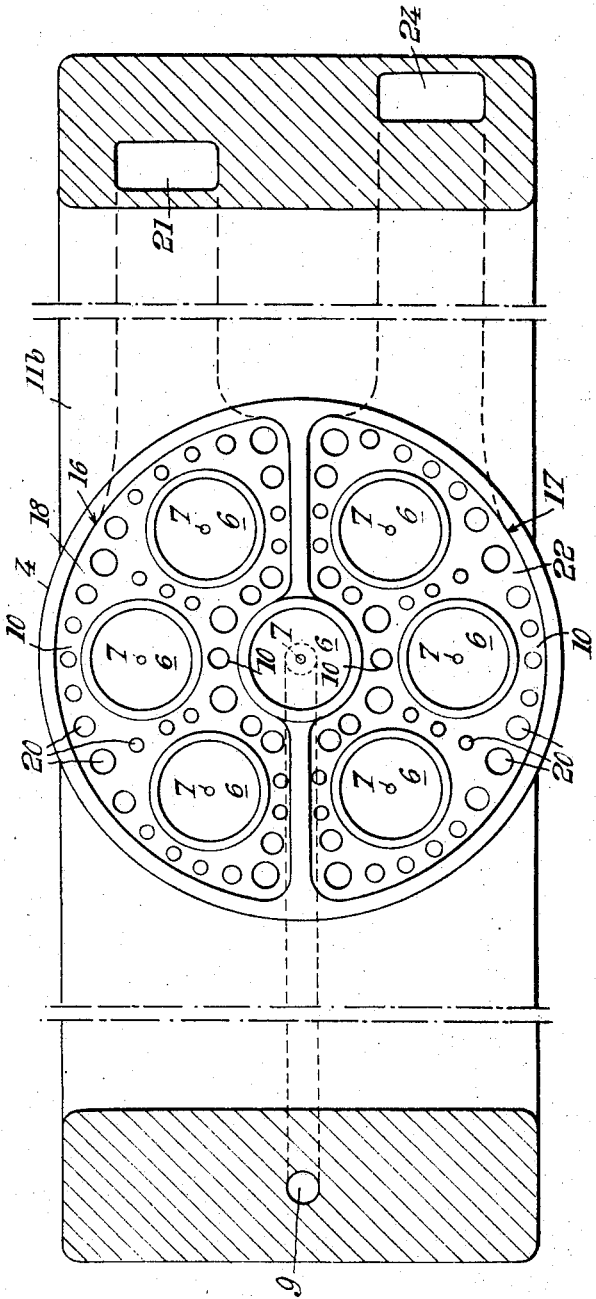

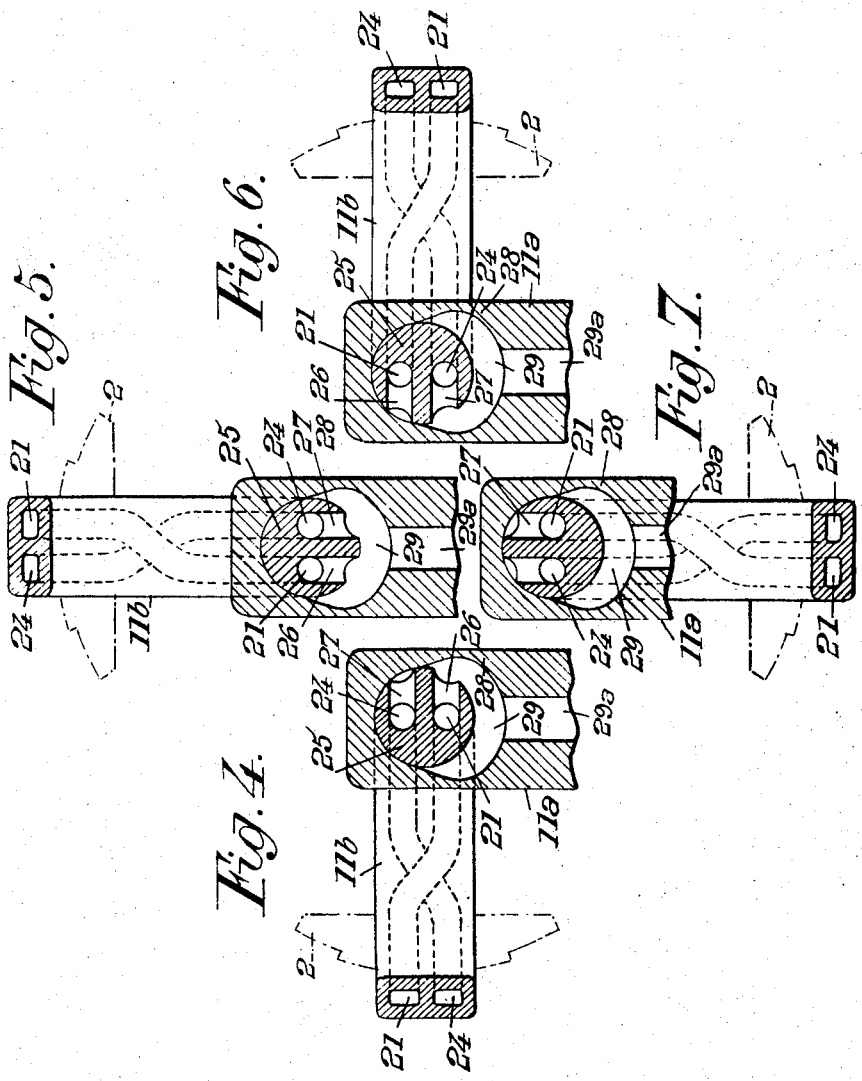

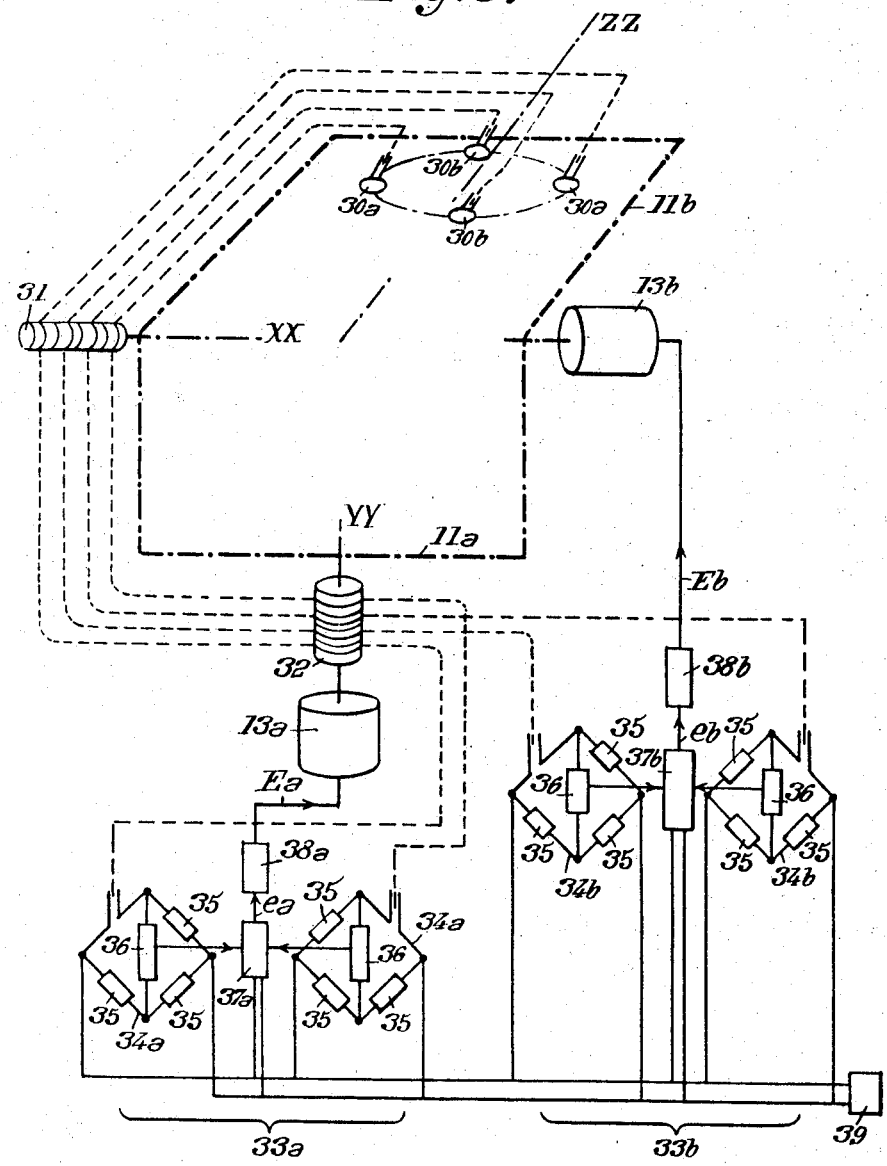

United States Patent Office 3,344,673
Patented Oct. 3, 1967

3,344,673
TESTING APPARATUS FOR SPACE VEHICLES, IN PARTICULAR FOR SATELLITES
Lionel Henri Gabriel Laming, Paris, France, assignor to Societe d'Exploitation des Materiels Hispano-Suiza, Bois-Colombes, Seine, France, a society of France
Filed Jan. 14, 1965, Ser. No. 425,469
Claims priority, application France, Jan. 17, 1964, 960,781
7 Claims. (Cl. 73—432)

ABSTRACT OF THE DISCLOSURE

The space vehicle to be tested is secured to a main spherical cap forming, with a complementary spherical cap, a hydrostatic spherical thrust bearing. There is provided, in the complementary spherical cap, a set of nozzles, fed with compressed air, surrounded by circular grooves connected with a vacuum pump. A suitable adjustment of the pressure source connected with said set of nozzles and of the vacuum pump connected with said circular grooves enables the thrust bearing to operate in any position whatever. The complementary spherical cap is mounted on a mechanical system adapted to occupy any position whatever on the sphere to which it belongs.

The present invention relates to testing apparatus for space vehicles, that is to say to apparatus for testing on the ground the means for controlling the attitude of said vehicles. The invention is more especially concerned with testing apparatus for satellites.

It is known that a space vehicle, and in particular a satellite, must be capable of stopping its movement of rotation about itself when such a rotation becomes undesirable, of occupying a fixed position with respect to a given reference system, for instance with respect to a set of stars, of changing its attitude, and so on.

The pilot means for determining the attitude of a space vehicle, the electronic circuits associated therewith, the gas ejection nozzles which determine the attitude of said vehicle and all other apparatus serving to control the satellite require being tested on the ground before the launching of the satellite.

Although some of these tests may be made by means of known devices which permit of varying the attitude of the satellite within some limits (generally inside a cone having an apex angle of 20°) it may be desirable to be able to impart several revolutions of the satellite about itself, for instance to simulate:

The case where the satellite has just left the rocket by means of which it has been launched and is still rotating upon itself at a relatively high rate, The case where the satellite is rotating upon itself because its piloting system is temporarily out of action;

The case where the satellite undergoes an erroneous change of attitude of 180° due to a temporary bad operation, to a stopping of its source of electrical energy or to a mistake in its control, The case where the satellite must undergo successive changes of attitude for predetermined reasons, and so on.

The chief object of the present inevntion is to provide a testing apparatus which is better adapted to meet the requirements of practice than those existing at the present time, in particular concerning the number and the choice of simulations that are possible.

The space vehicle to be tested is carried by a spherical cap called "main spherical cap" the geometrical center of which coincides with the center of gravity of the whole of said cap and said space vehicle, said main spherical cap cooperating with a complementary spherical cap of the same radius to form therewith a fluid bearing which permits displacements of limited amplitude of said space vehicle with respect to said complementary spherical cap.

The testing apparatus according to the present invention comprises:

Means for keeping said fluid bearing operative when the weight of the space vehicle tends to tear the main spherical cap away from the complementary spherical cap, A mechanical universal device interposed between said complementary spherical cap so that said complementary spherical cap can occupy any position upon the sphere, fixed with respect to the ground, to which it belongs, and Resetting means responsive to displacements beyond a given amplitude of the main spherical cap with respect to the complementary spherical cap for automatically moving said complementary cap with respect to said stationary reference system to restore said main cap into mean position with respect to said complementary cap. Whereby the advantages of the spherical fluid bearing (great smoothness of operation and high accuracy of centering) are combined with the possibilities of a mechanical attitude changing system (unlimited relative displacements).

A preferred embodiment of the present invention will be hereinafter described with reference to the appended drawings, given merely by way of example, and in which:

FIG. 3 is an end view, with parts in section, of an element of the apparatus of FIG. 2;

FIGS. 4, 5, 6 and 7 are diagrammatical views with parts cut away and parts in cross section illustrating the operation of the apparatus of FIG. 2;

FIG. 8 shows an electronic arrangement for operating the testing apparatus according to the present invention, as illustrated by FIG. 2.

Figure 1:
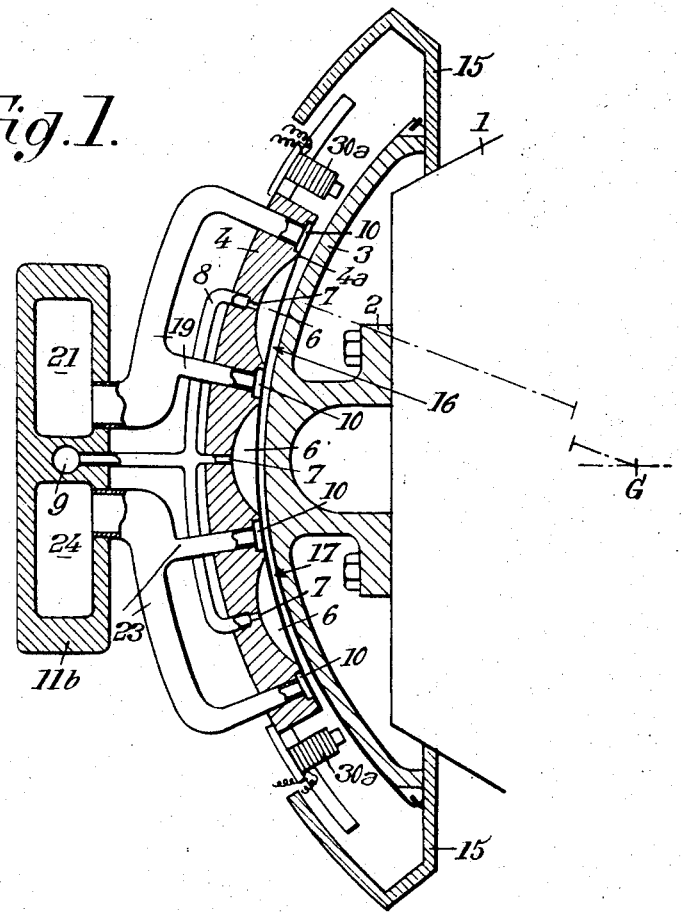
FIG. 1 is a diagrammatic longitudinal section of the spherical fluid bearing of the testing apparatus.

As shown by FIG. 1 the satellite 1 to be tested is fixed on a movable support 2 comprising a convex main spherical cap 3. The geometrical center of said spherical cap 3 coincides with the center of gravity of movable support 2 and satellite 1.

The main spherical cap 3 cooperates with a complementary concave spherical cap 4 adapted to constitute with said main spherical cap 3 a spherical fluid bearing. Of course in particular the radius of main cap 3 is equal to the radius of complementary cap 4.

Figure 2:
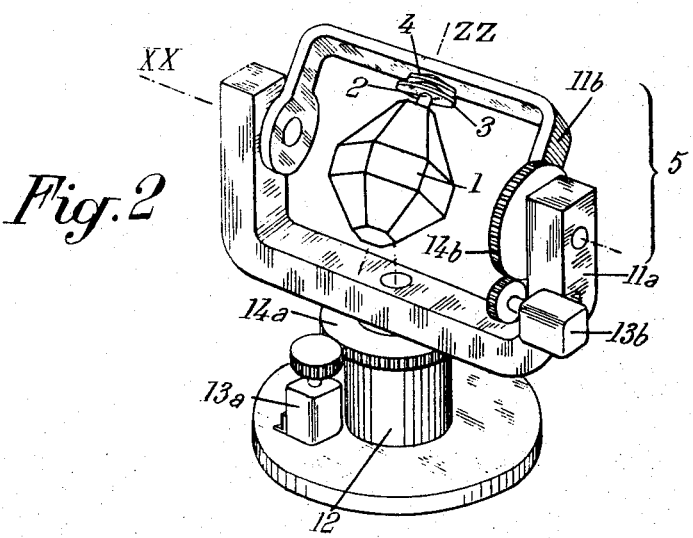
FIG 2 is a perspective view of said apparatus.

According to the present invention, and as illustrated by FIGS. 1 and 2, means are provided for keeping the above mentioned spherical fluid bearing operative when the weight of the space vehicle 1 tends to tear the main spherical cap away from the complementary spherical cap 4.

Furthermore, a mechanical universal supporting device 5 is interposed between the complementary spherical cap 4 and a fixed reference system (the ground) so that said complementary spherical cap 4 can occupy any position upon the sphere to which it belongs, Finally, resetting means are provided, which are responsive to displacements beyond a given amplitude of the main spherical cap with respect to the complementary spherical cap for automatically moving said complementary cap with respect to the ground to restore said main cap into mean position with respect to said complementary cap.

Such an apparatus combines the advantages of a spherical fluid bearing (great smoothness of operation and high accuracy of centering) with the possibilities of a mechanical attitude changing system (unlimited relative displacements).

As illustrated by FIG. 1 there is provided in face 4a of complementary cap 4 a plurality of recesses 6 of limited volume into the bottoms of which open nozzles 7 connected, through conduits 8, and a feed conduit 9, to a source of fluid (not shown), for instance of air, under pressure.

There is provided at the periphery of each of said recesses 6 an annular groove 10 connected with a vacuum pump (not shown).

The pressure and rate of feed of compressed air and the pressure and rate of outflow of the air that is sucked out are chosen so that the fluid bearing can operate in both directions, i.e. as well when the main spherical cap tends to be torn away from the complementary spherical cap as when said main spherical cap tends to be applied into contact with said complementary spherical cap.

As a matter of fact, if main cap 3 moves toward complementary cap 4, the pressure increases in recesses 6 in the manner well known in fluid bearings. If, on the contrary, cap 3 tends to move away from cap 4 the flow rate of the vacuum pump, which must then be substantially higher than the flow rate of gas under pressure, produces a suction in recesses 6 which prevents main cap from being torn away from complementary cap 4.

The mechanical system 5 adapted to permit spherical cap 4 to occupy any possible position on the sphere to which it belongs comprises, as shown by FIG. 2, two U-shaped frames 11a and 11b journalled with respect to each other about an axis XX, this mechanical system being such that the first frame 11a is mounted rotatable on a fixed support 12 about axis YY, under the action of an electric motor 13a acting upon a toothed wheel 14a fixed with respect to said frame 11a. Complementary cap 4 is fixed to the second frame 11b, coaxially with respect to the axis of symmetry ZZ. An electric motor 13b carried by frame 11a acts upon a toothed wheel 14b fixed with respect to frame 11b so as to able to rotate said last mentioned frame about axis XX.

Movable support 2 is provided with holding claws 15 distributed along the periphery of main cap 3 and intended to retain said movable support 2 in case of accidental failure of the fluid bearing means.

Some further indications will now be given concerning the construction of complementary cap 4.

Advantageously, as shown by FIGS. 1 and 3, there are seven recesses 6, to wit one central recess and six peripheral recesses distributed about said central recess. The distribution of these six recesses about axis ZZ is such that the plane defined by axis XX and ZZ separates complementary cap 4 into two areas 16 and 17 each of of which comprises three peripheral recesses 6.

There is provided, about the recesses 6 of area 16, a collecting space 18 which connects together annular grooves 10. Conduits 19 are provided between a chamber 21 connected with the vacuum pump and collecting space 18 into which said conduits 19 open through a plurality of holes 20.

In a likewise manner, there is provided about the recesses 6 of area 17, a collecting space 22 which connects together annular grooves 10. Conduits 23 are provided between a chamber 24 connected with the vacuum pump and collecting space 22 into which said conduits 23 open through a plurality of holes 20.

With such an arrangement it is possible, by making use of a distribution device which will be hereinafter referred to, to connect with the vacuum pump, Either area 16 and area 17,
Or area 16,
Or area 17,
Or neither one nor the other of these two areas.

It will be noted for instance that, in FIG. 1, where the axis ZZ of movable support 2 is horizontal and where frame 11b is located on the left of movable support 2, it is area 16 which must be connected with the vacuum pump, whereas area 17 must be placed out of communication with said vacuum pump.

In a general manner,

When axis ZZ is horizontal and frame 11b is located on the left hand side of movable support 2, area 16 must be connected with the vacuum pump, recesses 6 being still fed with air under pressure (FIG. 4), When axis ZZ is vertical and frame 11b is located above movable support 2, areas 16 and 17 must both be connected with the vacuum pump, recesses 6 being still fed with air under pressure (FIG. 5);

When axis ZZ is horizontal and frame 11b is located on the right hand side of movable support 2, area 17 must be connected with the vacuum pump, recesses 6 being still fed with air under pressure (FIG. 6), Finally, when axis ZZ is vertical and frame 11b is located under movable support 2, none of the two areas 16 and 17 is connected with the vacuum pump, recesses 6 being still fed with air under pressure (FIG. 7).

It will be understood that, with such a distribution of the vacuum in recesses 6, it is possible to reduce the pressure level of the air under pressure fed to recesses 6. This results from the fact that, chiefly in the position for which axis ZZ is horizontal (frame 11b being either on the left or on the right), the action of the air under pressure must merely oppose the weight of the system consisting of movable support 2 and satellite 1.

In order to obtain such connections between area 16 and/or area 17 and the vacuum pump, it is advantageous to make use of the construction illustrated by FIGS. 4, 5, 6 and 7.

According to this embodiment, chambers 21 and 24 are in communication with the distributing device constituted by one of the trunnions, for instance trunnion 25 of frame 11b, chamber 21 being connected through a port 26 and chamber 24 through a port 27.

These ports 26 and 27 are disposed in such manner that they are opened and closed in accordance with the position of trunnion 25 in the portion 28 of frame 11a within which it is mounted.

Thus said portion 28 includes a distribution chamber 29 connected through a conduit 29a with the vacuum pump and corresponding substantially to one half of the lateral surface of trunnion 25.

The shape and disposition of said distribution chamber 29 are such that:

(a) For the position of frame 11b illustrated by FIG. 4, port 26, corresponding to chamber 21, is wholly open and port 27, corresponding to chamber 24, is wholly closed;

(b) For the position of frame 11b shown by FIG. 5, port 26, corresponding to chamber 21, is still wholly open, and port 27 is now wholly open (its opening having been preferably gradual);

(c) For the position of frame 11b shown by FIG. 6, port 26, corresponding to chamber 21, is now wholly closed (its closing having been preferably gradual) and port 27, corresponding to chamber 24, is still wholly open;

(d) For the position of frame 11b shown by FIG. 7, port 26, corresponding to chamber 21, is still wholly closed, and port 27, corresponding to chamber 24, is now wholly closed (its closing having preferably been gradual).

Concerning now the control of mechanical device 5 in accordance with displacements of the whole of movable support 2 and satellite 1 beyond the maximum amplitude permitted by the fluid bearing, this control may be obtained by disposing, in complementary spherical cap 4 and around the periphery of main cap 3, a plurality of (for instance three) feelers (for instance of the magnetic, capacitive, photo-electric, or electric contract type). For a given displacement of the whole of movable support 2 and satellite 1 with respect to complementary cap 4 (for instance for any angular displacement exceeding 30°) about axis ZZ, said feelers transmit to a suitable electronic device orders for rotating electric motors 13a and 13b which move frames 11a and 11b in such manner as to return axis ZZ toward the axis of movable support 2.

For instance, as shown by FIG. 8, use is made of four feelers, of the variable reluctance type, disposed along lines at 90° of each other about complementary cap 4, in such manner that the plane defined by axes XX and ZZ contains two of these feelers, designated by reference numeral 30a, the two other feelers, designated by 30b, being then located in the plane defined by axes ZZ and YY.

The electrical indications supplied to said feelers are then transmitted to an electronic system through a rotating contact 31 mounted on axis XX and a rotating contact 32 mounted on axis YY.

This electronic system chiefly comprises two portions, to wit:

On the one hand, a portion 33a receiving the electrical indications from two feelers 30a and producing an electrical signal $Ea$ which represents, by its amplitude and its sign, the value and the direction of the torque required from electrical motor 13a, and On the other hand, a portion 33b, receiving the electrical indications from two feelers 30b and delivering an electrical signal $Eb$ which represents, by its amplitude and its sign, the value and the direction of the torque required from electrical motor 13b.

For this purpose, feelers 30a belong, respectively, to two bridges 34a, whereas feelers 30b belong, respectively, to two bridges 34b. Each of said bridges further comprises three balancing impedances 35 and an amplifier 36 for amplifying the unbalance current.

The unbalance currents of the two bridges 34a are fed to a decoding device 37a delivering a single electric signal $e_a$ which, amplified in amplifier 38a delivers the signal $Ea$ acting upon motor 13a.

The unbalance currents of the two bridges 34b are introduced into a decoding device 37b delivering a single electric signal $e_b$ which, amplified in an amplifier 38b, delivers the signal $Eb$ acting upon motor 13a.

The elements of this electronic system are supplied with currents from a stabilized source 39.

It should be noted that the unavoidable constructional defects of mechanical device 5 involve practically no drawback because there is no necessity that the respective centers of spherical cap 4 and spherical cap 3 coincide exactly with each other. In order to have a good operation, it is necessary and sufficient to have the center of gravity G of the whole of movable support 2 and satellite 1 at the center of convex spherical cap 3, the center of concave spherical cap 4 being possibly offset with respect to said first mentioned center of gravity, due for instance to an eccentricity of the mechanical axis. It is this feature which supplies all the advantages of a testing apparatus according to the present invention.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. An apparatus for testing a space vehicle which comprises, in combination,
    a main spherical cap adapted to have said space vehicle secured thereto in such manner that the geometrical center of said main spherical cap coincides with the center of gravity of the whole of said main spherical cap and of said space vehicle secured thereto,
    a complementary spherical cap of the same radius as said main spherical cap and adapted to match it,
    fluid bearing means for holding said main spherical cap in concentric juxtaposition with said complementary spherical cap, said fluid bearing means being operative when the weight of the space vehicle tends to tear the main spherical cap away from the complementary spherical cap,
    a support fixed with respect to the ground,
    deformable mechanical means for connecting said complementary spherical cap with said support so that the center of the spherical surface of said complementary spherical cap remains fixed with respect to said support, and
    resetting means responsive to relative displacements of the main spherical cap with respect to the complementary spherical cap for automatically controlling said mechanical means to move said complementary cap in such manner as to keep the amplitude of said relative displacements within given limits.

2. An apparatus for testing a space vehicle which comprises, in combination,
    a main spherical cap adapted to have said space vehicle secured thereto in such manner that the geometrical center of said main spherical cap coincides with the center of gravity of the whole of said main spherical cap and of said space vehicle secured thereto,
    a complementary spherical cap of the same radius as said main spherical cap and adapted to match it,
    fluid bearing means for holding said main spherical cap in concentric juxtaposition with said complementary spherical cap, said fluid bearing means being operative when the weight of the space vehicle tends to tear the main spherical cap away from the complementary spherical cap, said complementary spherical cap being provided in its concave face with a plurality of recesses of limited volume, and said fluid bearing means including nozzles opening into the bottoms of said recesses, conduit means leading to said nozzles, a source of fluid under pressure, a feed conduit connecting said source of fluid under pressure said conduit means, a vacuum pump, annular grooves located at the periphery of said recesses, and means for connecting said annular grooves to said vacuum pump.
    a support fixed with respect to the ground,
    deformable mechanical means for connecting said complementary spherical cap with said support so that the center of the spherical surface of said complementary spherical cap remains fixed with respect to said support, and
    resetting means responsive to relative displacements of the main spherical cap with respect to the complementary spherical cap for automatically controlling said mechanical means to move said complementary cap in such manner as to keep the amplitude of said relative displacements within given limits.

3. An apparatus for testing a space vehicle which comprises, in combination,
    a main spherical cap adapted to have said space vehicle secured thereto in such manner that the geometrical center of said main spherical cap coincides with the center of gravity of the whole of said main spherical cap and of said space vehicle secured thereto,
    a complementary spherical cap of the same radius as said main spherical cap and adapted to match it,
    fluid bearing means for holding said main spherical cap in concentric juxtaposition with said complementary spherical cap, said fluid bearing means being operative when the weight of the space vehicle tends to tear the main spherical cap away from the complementary spherical cap, said complementary spherical cap being provided in its concave face with a plurality of recesses of limited volume, and said fluid bearing means including nozzles opening into the bottom of recesses, conduit means leading to said nozzles, a source of fluid under pressure, a feed conduit connecting said source of fluid under pressure to said conduit means, a vacuum pump, annular grooves located at the periphery of said recesses, and means for connecting said annular grooves to said vacuum pump, a support fixed with respect to the ground, deformable mechanical means for connecting said complementary spherical cap with said support so that the center of the spherical surface of said complementary spherical cap remains fixed with respect to said support, said mechanical means comprising a first U-shaped frame, mounted rotatably with respect to said support about a vertical axis, an electric motor for rotating said first U-shaped frame about said vertical axis, a second U-shaped frame, journalled in said first U-shaped frame about a horizontal axis, said complementary spherical cap being fixed to said second U-shaped frame coaxially with respect to the common axis of symmetry of said complementary spherical cap and said second U-shaped frame, an electric motor carried by said first U-shaped frame and capable of rotating said second U-shaped frame about said horizontal axis, and resetting means responsive to relative displacements of the main spherical cap with respect to the complementary spherical cap for automatically controlling said mechanical means to move said complementary cap in such manner as to keep the amplitude of said relative displacements within given limits.

4. An apparatus according to claim 3 further comprising holding claws distributed along the periphery of said main spherical cap for retaining it in case of accidental failure of the fluid bearing means.

5. An apparatus according to claim 3 in which the number of said recesses is seven, to wit, one central recess and six peripheral recesses distributed about said central recess, the distribution of said six peripheral recesses about the common axis of symmetry of said complementary spherical cap and said second U-shaped frame being such that the plane defined by said common axis of symmetry and said horizontal axis separates said complementary spherical cap into two areas, to wit, an upper area and a lower area, each of which comprises three peripheral recesses, said upper area of said complementary spherical cap being provided, about its three recesses, with an upper collecting space connecting together the three annular grooves of said three recesses, said second U-shaped frame being provided with a first chamber, first conduit means connecting said first chamber to said upper collecting space into which said first conduit means open through a plurality of holes, said lower area of said complementary spherical cap being provided, about its three recesses, with a lower collecting space connecting together the three annular grooves of said three last mentioned recesses, said second U-shaped frame being provided with a second chamber, second conduit means connecting said second chamber to said lower collecting space into which said first conduit means open through a plurality of holes, distribution valve means between, on the one hand, said vacuum pump and, on the other hand, said areas of said complementary spherical cap, said valve means being capable of ensuring connection of said vacuum pump alternatively with both of said upper and lower areas, with said upper area alone and with said lower area alone, said valve means being adapted to cut off the communication between said vacuum pump and both of said areas.

6. An apparatus as set forth in claim 5 wherein said distribution valve means comprise the journal of said second U-shaped frame and the portion of said first U-shaped frame, with which said journal cooperates, said journal being provided with two apertures, one of said two apertures being connected to said upper chamber, the other aperture being connected to said lower chamber, said apertures being adapted to be controlled according to the angular position of said journal with respect to said first U-shaped frame.

7. An apparatus according to claim 3 wherein said resetting means comprises:

two variable reluctance pick-ups at 180° to each other carried by said complementary spherical cap and located in the plane defined by said horizontal axis and said common axis of symmetry of said complementary spherical cap and said second U-shaped frame, a first bridge means comprising three balancing impedances on three sides thereof, the fourth side being connected to one of said two pick-ups, an amplifier for amplifying the unbalance current of said first bridge means, a second bridge means comprising three balancing impedances on three sides thereof, the fourth side being connected to the other of said pick-ups, an amplifier for amplifying the unbalance current of said second bridge means, a decoder mounted to receive said two unbalance currents of said first and second bridge means, an amplifier for amplifying the output signal of said decoder, means for transmitting the amplified signal delivered by said amplifier to the electric motor for rotating said first U-shaped frame about said vertical axis, two other pick-ups of variable reluctance, distributed at 180° about said complementary spherical cap and located in the plane defined by said vertical axis and said common axis of symmetry of said complementary spherical cap and said second U-shaped frame, a third bridge means comprising three balancing impedances on three sides thereof, the fourth side of said last mentioned bridge being connected to one of said two last mentioned pick-ups, an amplifier for amplifying the unbalance current of said third bridge means, a fourth bridge means comprising three balancing impedances on three sides thereof, the fourth side being connected to the other of said two last mentioned pick-ups, an amplifier for amplifying the unbalance current of said fourth bridge means, a decoder, means for transmitting the two unbalance currents of said third and fourth bridge means to said last mentioned decoder, an amplifier for amplifying the signal of said last mentioned decoder, and means for transmitting this last mentioned amplified signal to said electric motor carried by said first U-shaped frame, for rotating said second U-shaped frame about said horizontal axis.

References Cited

UNITED STATES PATENTS

| | | | |
|---|---|---|---|
| 3,092,918 | 6/1963 | Haeussermann et al. | |
| 3,203,224 | 8/1965 | Aske | 73—1 |
| 3,266,052 | 8/1966 | Yamron | 73—1 |
| 3,271,086 | 9/1966 | Deffrenne | 308—9 XR |

DAVID SCHONBERG, *Primary Examiner.*